(12) United States Patent
Rose

(10) Patent No.: US 7,289,675 B2
(45) Date of Patent: *Oct. 30, 2007

(54) SCALABLE PREDICTIVE CODING METHOD AND APPARATUS

(75) Inventor: Kenneth Rose, Goleta, CA (US)

(73) Assignee: Voicecraft, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/147,405

(22) Filed: Jun. 7, 2005

(65) Prior Publication Data

US 2005/0265616 A1  Dec. 1, 2005

Related U.S. Application Data

(63) Continuation of application No. 10/816,733, filed on Apr. 2, 2004, now Pat. No. 6,917,714, which is a continuation of application No. 09/216,096, filed on Dec. 18, 1998, now Pat. No. 6,731,811.

(60) Provisional application No. 60/068,331, filed on Dec. 19, 1997.

(51) Int. Cl.
*G06K 9/36* (2006.01)

(52) U.S. Cl. ............... 382/238; 238/232; 238/239

(58) Field of Classification Search ............ 382/232, 382/236, 238–251; 348/397.1; 704/230

See application file for complete search history.

(56) References Cited

U.S. PATENT DOCUMENTS

| | | |
|---|---|---|
| 3,568,063 A | 3/1971 | Brown |
| 4,144,543 A | 3/1979 | Koga |
| 5,349,383 A | 9/1994 | Parke et al. |
| 5,408,270 A | 4/1995 | Lim |
| 5,418,571 A | 5/1995 | Ghanbari |
| 5,455,629 A | 10/1995 | Sun et al. |
| 5,461,423 A | 10/1995 | Tsukagoshi |
| 5,495,291 A | 2/1996 | Adams |
| 5,500,677 A | 3/1996 | Fert |
| 5,508,745 A | 4/1996 | Jo |
| 5,515,377 A | 5/1996 | Horne et al. |
| 5,517,595 A | 5/1996 | Kleijn |

(Continued)

FOREIGN PATENT DOCUMENTS

EP   0 634 871 A2   1/1995

(Continued)

OTHER PUBLICATIONS

Nakamura et al., "Scalable Coding Schemes Based on DCT and MC Prediction", Proceedings of the International Conference on Image Processing (ICIP), IEEE, vol. 2, Oct. 23, 1995, pp. 575-578.

Puri et al., "Spatial Domain Resolution Scalable Video Coding", Proceedings of the SPIE Visual Communications and Image Processing, vol. 2094, Oct. 1993, pp. 718-729.

(Continued)

*Primary Examiner*—Duy M. Dang
(74) *Attorney, Agent, or Firm*—John P. O'Banion

(57) ABSTRACT

A scalable predictive coder in which the current frame of data is predicted at the enhancement-layer by processing and combining the reconstructed signal at: (i) the current base-layer (or lower layers) frame; and (ii) the previous enhancement-layer frame. The combining rule takes into account the compressed prediction error of the base-layer, and the parameters used for its compression.

12 Claims, 9 Drawing Sheets

U.S. PATENT DOCUMENTS

| | | | |
|---|---|---|---|
| 5,537,440 | A | 7/1996 | Eyuboglu et al. |
| 5,568,199 | A | 10/1996 | Kajimoto et al. |
| 5,600,737 | A | 2/1997 | Murakami et al. |
| 5,621,760 | A | 4/1997 | Gotoh et al. |
| 5,680,483 | A | 10/1997 | Tranchard |
| 5,886,736 | A | 3/1999 | Chen |
| 5,973,739 | A | 10/1999 | Nilsson |
| 6,128,041 | A | 10/2000 | Han et al. |
| 6,731,811 | B1 * | 5/2004 | Rose .......................... 382/238 |
| 6,917,714 | B2 * | 7/2005 | Rose .......................... 382/238 |

FOREIGN PATENT DOCUMENTS

| | | | |
|---|---|---|---|
| EP | 0 644 695 | A2 | 3/1995 |
| EP | 0 771 119 | A2 | 5/1997 |

OTHER PUBLICATIONS

International Telecommunication Union, Study Group16—Contribution Com-999, "Draft Text of Recommendation H.263 Version 2 ("H.263+") for Decision", Jan. 27, 1998, Introduction, pp. 1-3, Cover Page, Forward, Contents pp. 99-iv, Summary pp. v, Draft Recommendation pp. 1-149.

International Telecommunication Union, Study Group16—Contribution_, "Draft for Annexes U, V, and W to Recommendation H.263", Nov. 2000, Cover Page, Annex U pp. 2-24, Annex V pp. 25-31, Annex W pp. 32-45.

International Telecommunication Union, Study Group16—Contribution_, "Annex X to ITU-T Recommendation H.263—Video Coding for Low Bit Rate Communication", Dec. 21, 2001, pp. 1-15.

* cited by examiner

SCALABLE PREDICTIVE CODING METHOD AND APPARATUS

CROSS-REFERENCE TO RELATED APPLICATIONS

This application is a continuation of U.S. application Ser. No. 10/816,733, filed on Apr. 2, 2004, now U.S. Pat. No. 6,917,714, incorporated herein by reference in its entirety, which is a continuation of U.S. application Ser. No. 09/216,096, filed on Dec. 18, 1998, now U.S. Pat. No. 6,731,811, incorporated herein by reference in its entirety, which claims priority to U.S. provisional application Ser. No. 60/068,331 filed on Dec. 19, 1997, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

REFERENCED PUBLICATIONS

The following publications which are referenced herein using numbers in square brackets (e.g., [1]) are incorporated herein by reference:

[1] D. Wilson and M. Ghanbari, "Transmission of SNR scalable two layer MPEG-2 coded video through ATM networks," *Proc. 7th International Workshop on Packet Video*, pp. 185-189, Brisbane Australia, March 1996.

[2] B. Girod, U. Horn, and B. Belzer, "Scalable video coding with multiscale motion compensation and unequal error protection," In Y. Wang, S. Panwar, S.-P. Kim, and H. L. Bertoni, editors, *Multimedia Communications and Video Coding*, pp. 475-482, New York: Plenum Press, 1996.

[3] B. G. Haskell, A. Puri, and A. N. Netravali, *Digital video: an introduction to MPEG-2*. New York: Chapman and Hall, International Thomson Pub., 1997.

[4] *Draft text of H.263*, Version 2 (H.263+).

[5] T. K. Tan, K. K. Pang, and K. N. Ngan, "A frequency scalable coding scheme employing pyramid and subband techniques," *IEEE Transactions on Circuits and Systems for Video Technology*, pp. 203-207, April 1994.

[6] A. Gersho and R. M. Gray, *Vector Quantization and Signal Compression*. Kluwer Academic Press, 1992.

BACKGROUND OF THE INVENTION

1. Field of the Invention

This invention pertains generally to data compression methods and systems, and more particularly to an efficient scalable predictive coding method and system where most or all of the information available to the enhancement-layer is exploited to improve the quality of the prediction.

2. Description of the Background Art

Many applications require data, such as video, to be simultaneously decodable at a variety of rates. Examples include applications involving broadcast over differing channels, multicast in a complex network where the channels/links dictate the feasible bit rate for each user, the co-existence of receivers of different complexity (and cost), and time-varying channels. An associated compression technique is "scalable" if it offers a variety of decoding rates using the same basic algorithm, and where the lower rate information streams are embedded in the higher rate bit-streams in a manner that minimizes redundancy.

A predictive coding system for encoding and decoding a signal without scalability is well-known in the literature of signal compression. (See for example: predictive vector quantization [6], and motion-compensated predictive transform coding of video [3]). In such predictive coding systems the encoder includes a decoder and memory so that what is actually encoded is the difference between the input signal and a predicted version of the reproduced signal, this difference signal being called the residual. The decoder contains a prediction loop whereby the current residual frame is decoded and then it is added to a prediction of the current frame obtained from the previous reproduced frame. In some cases, the predictor uses several prior frames to predict the current frame.

A major difficulty encountered in scalable predictive coding is how to take advantage of the additional information, available to the enhancement-layer decoder for improved prediction, without causing undesired conflicts with the information obtained from the base layer. FIG. 1 depicts a two-layer scalable coding system 10 where it is assumed that the original input signal (e.g., an audio or video signal) is segmented into frames that are sequentially encoded. Typical examples are video frames, and speech frames, but "frame" here will also cover the degenerate case of a single sample as in differential pulse coded modulation (DPCM). The term "frame" as used herein refers either to a group of contiguous samples of an original input signal or a set of parameters extracted from the original group of samples (such as a set of transform coefficients obtained by a discrete-cosine transform (DCT) operation on the original group of samples) and in each case the terminology "frame" or "signal" will be used to refer to this entity that is representative of the original group of samples or is itself the original group of samples.

The input frame 12, x(n), is compressed by the base encoder (BE) 14 which produces the base bit-stream 16. The enhancement-layer encoder (EE) 18 has access to the input frame 12 and to any information produced by or available to BE 14. EE 18 uses this data to generate the enhancement-layer bit-stream 20. A base decoder (BD) 22 receives the base bit-stream 16 and produces a reconstruction 24, $\hat{x}_b(n)$, while the enhancement-layer decoder (ED) 26 has access to both bit-streams and produces an enhanced reconstruction 28, $\hat{x}_e(n)$. The reconstruction frames that are available at the decoder are used to predict or estimate the current frame. Note that ED 26 has access to both bit streams and hence it effectively has access to both the reconstruction frame at the base layer, $\hat{x}_b(n)$, and the previous reconstructed frame at the enhancement layer $\hat{x}_e(n-1)$, while BD 22 has only access to the previous reconstructed frame at the base layer, $\hat{x}_b(n-1)$, which is stored in the memory within BD. In the case of a scalable coding system with multiple enhancement layers, an enhancement layer decoder may have access to the reconstruction frames from lower enhancement layers as well as from the base layer. The prediction loop (internal to the operation of BD as in any predictive coding system but not shown in the figure) in this configuration causes severe difficulties in the design of scalable coding. Accordingly, a number of approaches to scalable coding have been developed. These include, (1) The standard approach: At the base layer, BE 14 compresses the residual $$r_b(n)=x(n)-P[\hat{x}_b(n-1)],$$

where P denotes the predictor (e.g., motion compensator in the case of video coding). Note that for notational simplicity we assume first-order prediction, but in general several previous frames may be used. BD 22 produces the reconstruction $$\hat{x}_b(n)=P[\hat{x}_b(n-1)]+\hat{r}_b(n),$$

where $\hat{r}_b(n)$ is the compressed-reconstructed residual. At the enhancement-layer, EE 18 compresses the base layer's reconstruction error $$r_e^{(1)}=x(n)-\hat{x}_b(n)=x(n)-P[\hat{x}_b(n-1)]-\hat{r}_b(n).$$

The enhancement-layer reconstruction is $$\hat{x}_e(n)=\hat{x}_b(n)+\hat{r}_e^{(1)}(n)=P[\hat{x}_b(n-1)]+\hat{r}_b(n)+\hat{r}_e^{(1)}(n).$$

See, e.g., [1]. A deficiency of this approach is that no advantage is taken of the potentially superior prediction due to the availability of $\hat{x}_e(n-1)$ at the ED 26.

(2) The separate coding approach: BE 14 compresses $r_b(n)$ as above, but EE 18 compresses the "enhancement-only" prediction error $$r_e(2)=x(n)-P[\hat{x}_e(n-1)]$$

directly. The enhancement-layer reconstruction is $$\hat{x}_e(n)=P[\hat{x}_e(n-1)]+\hat{r}_e^{(2)}(n).$$

A deficiency of this approach is that, while the approach takes advantage of information available only to the enhancement-layer, it does not exploit the knowledge of $\hat{r}_b(n)$ which is also available at the enhancement-layer. The two layers are, in fact, separately encoded except for savings on overhead information which needs not be repeated (such as motion vectors in video coding) [2].

(3) Layer-specific prediction at the decoder approach: BD 22 reconstructs the frame as $$\hat{x}_b(n)=P[\hat{x}_b(n-1)]+\hat{r}_b(n),$$

and ED 26 reconstructs as $$\hat{x}_e(n)=P[\hat{x}_e(n-1)]+\hat{r}_b(n)+\hat{r}_e(n)$$

However, the encoders BE 14 and EE 18 use the same prediction [3], and the options are:

(a) Both encoders use base-layer prediction $P[\hat{x}_b(n-1)]$. This results in drift of the enhancement-layer decoder. (The term "drift" refers to a form of mismatch where the decoder uses a different prediction than the one assumed by the encoder. This mismatch tends to grow as the "corrections" provided by the encoder are misguiding, hence, the decoder "drifts away").

(b) Both encoders use enhancement-layer prediction $P[\hat{x}_e(n-1)]$. This results in drift of the base-layer decoder.

(4) Switch between approaches (1) and (2) on a per frame or per block basis [4], or per sample [5]. This approach has the deficiencies of either approach (1) or (2) as described above, at each time depending on the switching decision.

Therefore, a need exists for a scalable predictive coding system and method that exploits the information available to the enhancement layer to improve quality without causing undesired conflicts as outlined above. The present invention satisfies those needs, as well as others, and overcomes the deficiencies of previously developed predictive coding systems and methods.

BRIEF SUMMARY OF THE INVENTION

The present invention addresses the prediction loop deficiencies in conventional scalable coding methods and systems in a way that achieves efficient scalability of predictive coding. The approach is generally applicable and may, in particular, be applied to standard video and audio compression. In the present invention, most or all of the information available at an enhancement-layer may be exploited to improve the quality of the prediction.

By way of example, and not of limitation, in the present invention the current frame is predicted at the enhancement-layer by processing and combining the reconstructed signal representing: (i) the current base-layer (or lower layers) frame; and (ii) the previous enhancement-layer frame. The combining rule takes into account the compressed prediction error of the base-layer, and the parameters used for its compression. The main difficulty overcome by this invention is in the apparent conflicts between these two sources of information and their impact as described in the Background of the Invention. This difficulty may explain why existing known methods exclusively use one of these information sources at any given time. These methods will be generally referred to here as switching techniques (which include as a special case the exclusive use of one of the information sources at all times). Additionally, the invention optionally includes a special enhancement-layer synchronization mode for the case where the communication rate for a given receiver is time varying (e.g., in mobile communications). This mode may be applied periodically to allow the receiver to upgrade to enhancement-layer performance even though it does not have prior enhancement-layer reconstructed frames.

An object of the invention is to achieve efficient scalability of predictive coding.

Another object of the invention is to provide a method and system for scalable predictive coding that is applicable to typical or standard video and audio compression.

Another object of the invention is to provide a scalable predictive coding method and system in which all or most of the information available at an enhancement-layer is exploited to improve the quality of the prediction.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Referring more specifically to the drawings, where like reference numbers, labels and symbols denote like parts, for illustrative purposes the present invention will be described with reference to the encoder generally shown in FIG. 2, as well as the encoding system shown in FIG. 2 through FIG. 6, and the scalable predictive coding method described in connection therewith. Various embodiments of encoders and decoders employing the present invention, and details therefore, are shown and described in FIG. 7 through FIG. 9.

The method of the present invention generally comprises upgrading the prediction used at each enhancement-layer by combining, with minimal conflict, the information provided from both sources, namely, information available at, and used by, the base-layer (or lower layers), and information that is available only at the enhancement-layer. In the case of a scalable predictive coding system with multiple enhancement layers, the prediction at an enhancement layer may combine information provided from all lower enhancement layers as well. The invention provides for prediction or estimation of the signal frame itself in any representation, or any subset of signal representation coefficients such as transform coefficients (e.g., in video, audio), line spectral frequencies (e.g., in speech or audio), etc. The term "frame" and the corresponding mathematical notation will be used generally to refer to the relevant set of frame coefficients being estimated or predicted by the method in each particular application.

Figure 1:
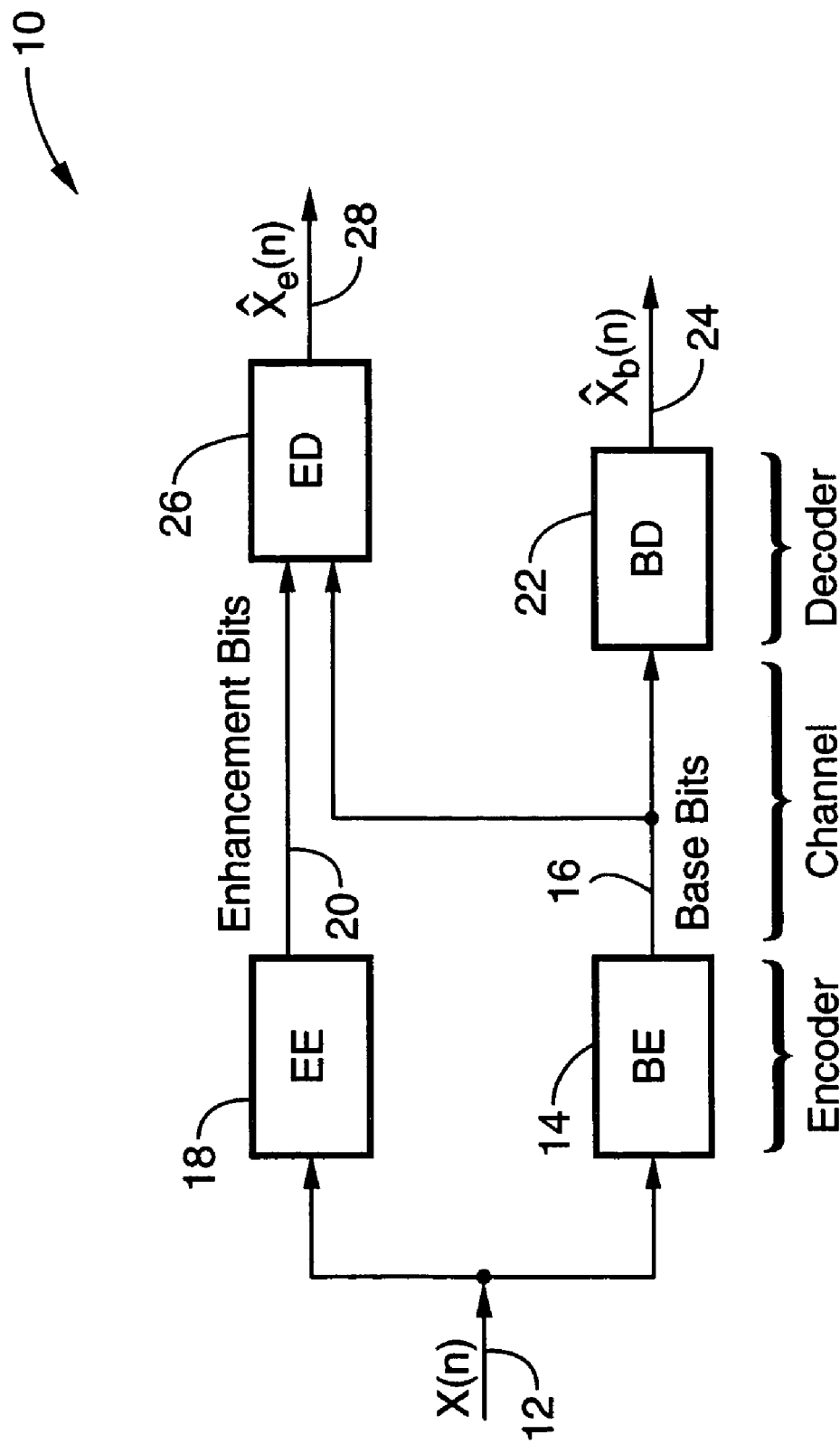
FIG. 1 is a functional block diagram of a conventional two-layer predictive coding system.
Figure 2:
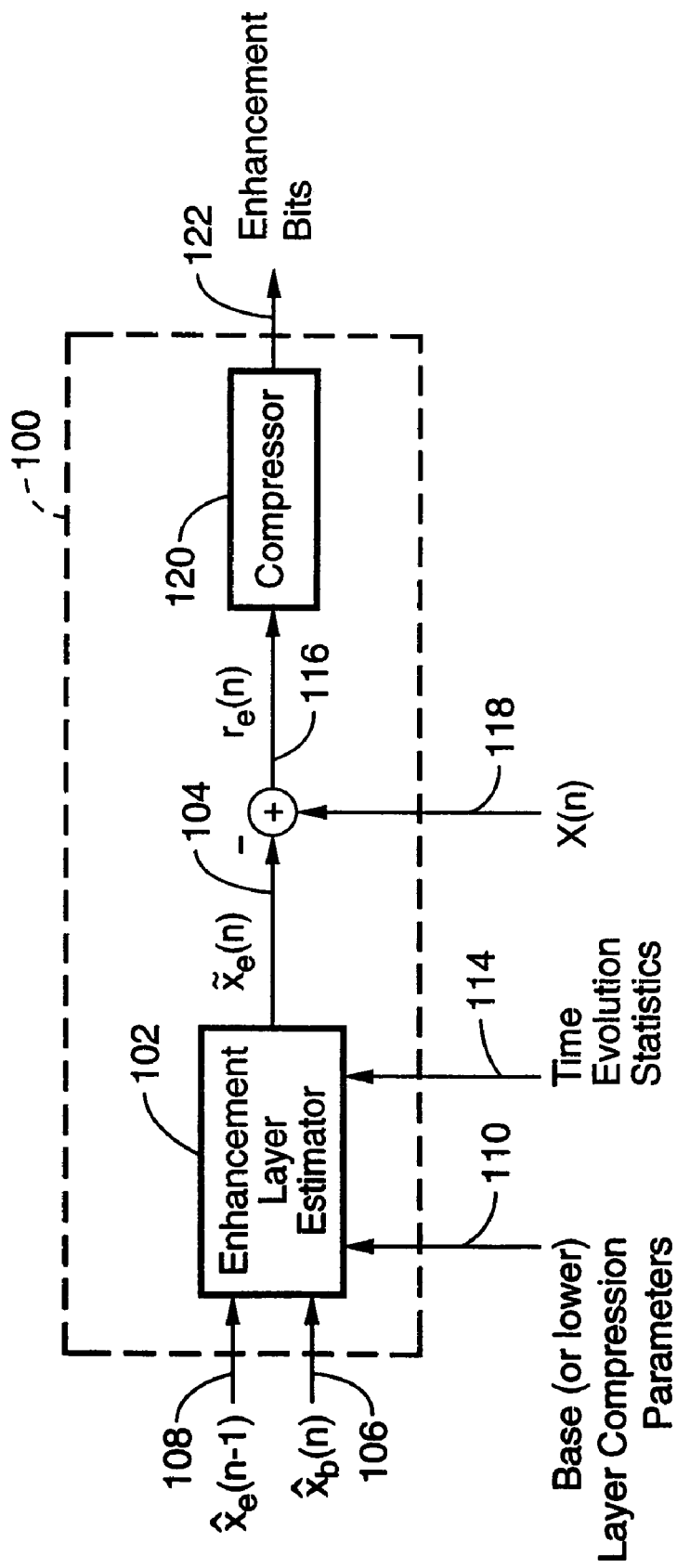
FIG. 2 is a functional block diagram of an enhancement layer encoder of a scalable predictive coding system in accordance with the present invention.

Referring first to FIG. 2, a functional block diagram of an enhancement layer encoder of a scalable predictive coding system in accordance with the present invention is shown. In the enhancement layer encoder 100 of the present invention, an enhancement layer estimator (ELE) 102 computes a new predicted frame 104, $\tilde{x}_e(n)$, by combining information from the reconstruction frame 106 at the base layer, $\hat{x}_b(n)$ and from the previous reconstructed frame 108 at the enhancement layer $\hat{x}_e(n-1)$. Note that first order prediction is described for notational simplicity but several previous frames may be used. The combining rule depends on any or all of, but not limited to, the following parameters: the compression parameters 110 of the base layer (such as quantization step and threshold, and the quantized base-layer residual 112, $\hat{r}_b(n)$, (see FIG. 3)), and the statistical parameters 114 of the time evolution of the frames (such as inter-frame correlation coefficients and variance). The statistical parameters may be either estimated off-line from training data, or estimated on-line by an adaptive estimator which tracks variation in the signal statistics based on either the original signal (in which case the parameters need to be transmitted to the decoder) or based on reconstructed signals which are available to the receiver. The exact definition of the combination rule depends on the level of complexity allowed for the module. At the high end, one may compute a possibly complex, optimal predicted frame given all the available information. The enhancement layer residual 116, $r_e(n)$, which is the difference between the input frame 118, $x(n)$, and the predicted frame 104, $\tilde{x}_e(n)$, is then compressed by a compressor 120 to produce the enhancement bits 122.

Figure 3:
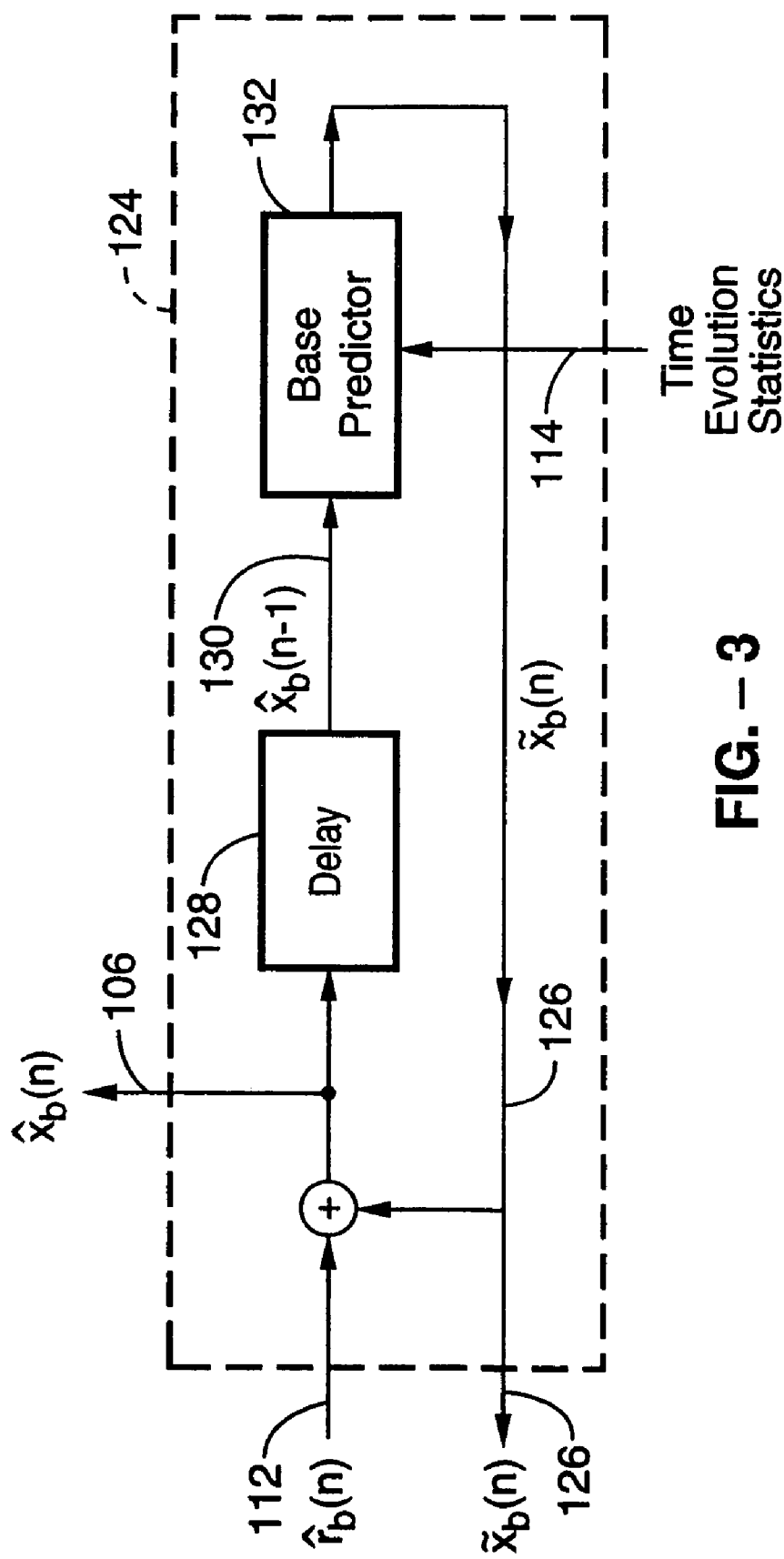
FIG. 3 is a functional block diagram of a base layer reconstruction module according to the present invention.

Referring to FIG. 3 through FIG. 6, a complete scalable predictive coding system for use with this invention is shown. While only three layers are shown, it will be appreciated that additional layers can be added and are contemplated within the scope of the invention. FIG. 3 shows a base layer reconstruction module 124 which receives the quantized base layer residual 112, $\hat{r}_b(n)$, and adds it to the base predicted frame 126, $\tilde{x}_b(n)$, to produce the base layer reconstruction frame 106, $\hat{x}_b(n)$. A delay 128 produces a delayed base reconstructed frame 130, $\hat{x}_b(n-1)$, which is input to the base predictor 132 which computes the base predicted frame 126, $\tilde{x}_b(n)$, which is needed to produce the reconstructed frame as explained above.

Figure 4:
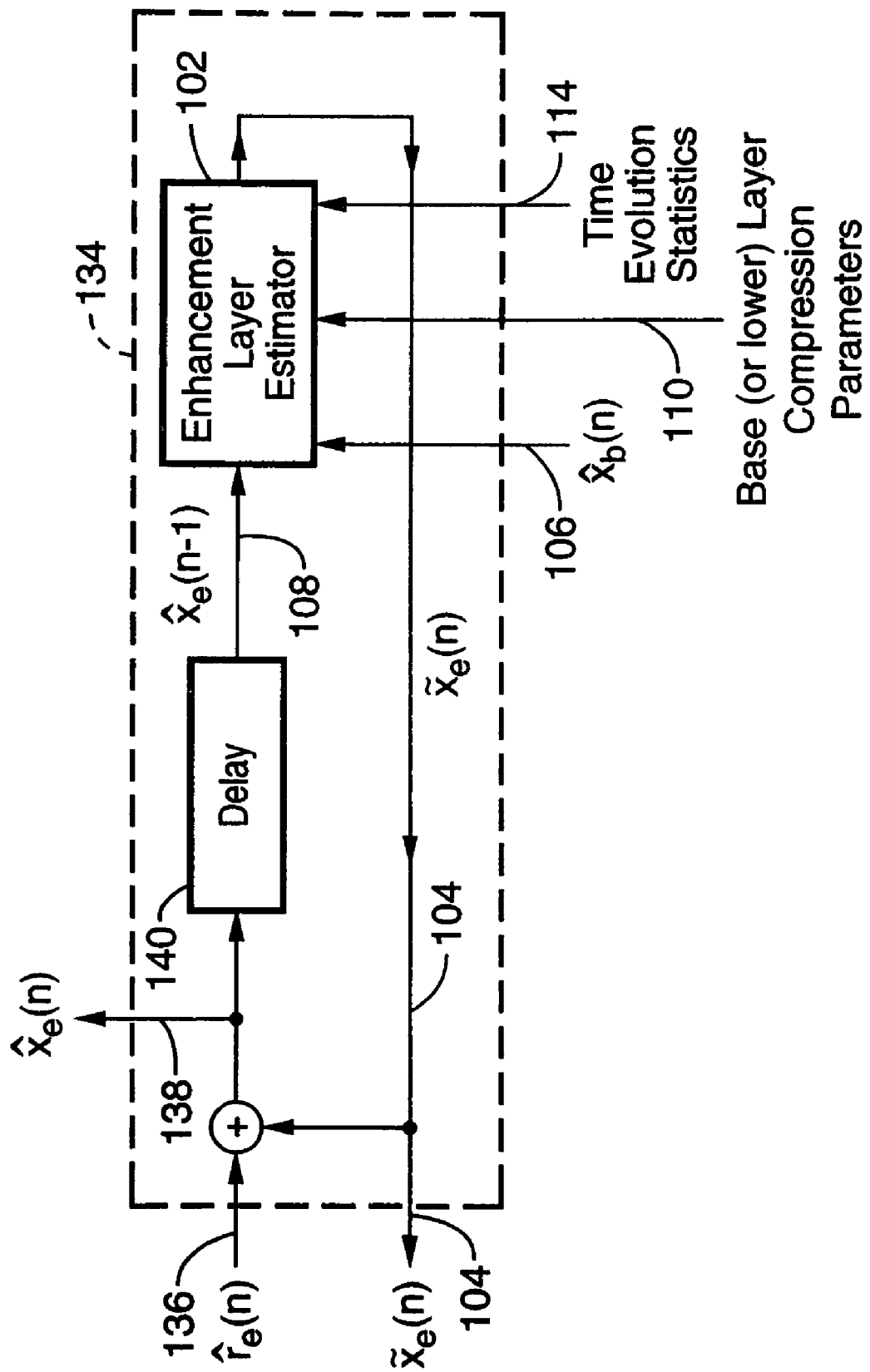
FIG. 4 is a functional block diagram of an enhancement layer reconstruction module according to the present invention.

The enhancement layer reconstruction module 134 shown in FIG. 4 receives the quantized enhancement layer residual 136, $\hat{r}_e(n)$, and adds it to the enhancement layer predicted frame 104, $\tilde{x}_e(n)$, to produce the enhancement layer reconstruction frame 138, $\hat{x}_e(n)$. A delay 140 produces a delayed enhancement layer reconstructed frame 108, $\hat{x}_e(n-1)$, which is input to the enhancement layer estimator 102, which in turn computes the enhancement layer predicted frame 104, $\tilde{x}_e(n)$, as explained with reference to FIG. 2.

Figure 5:
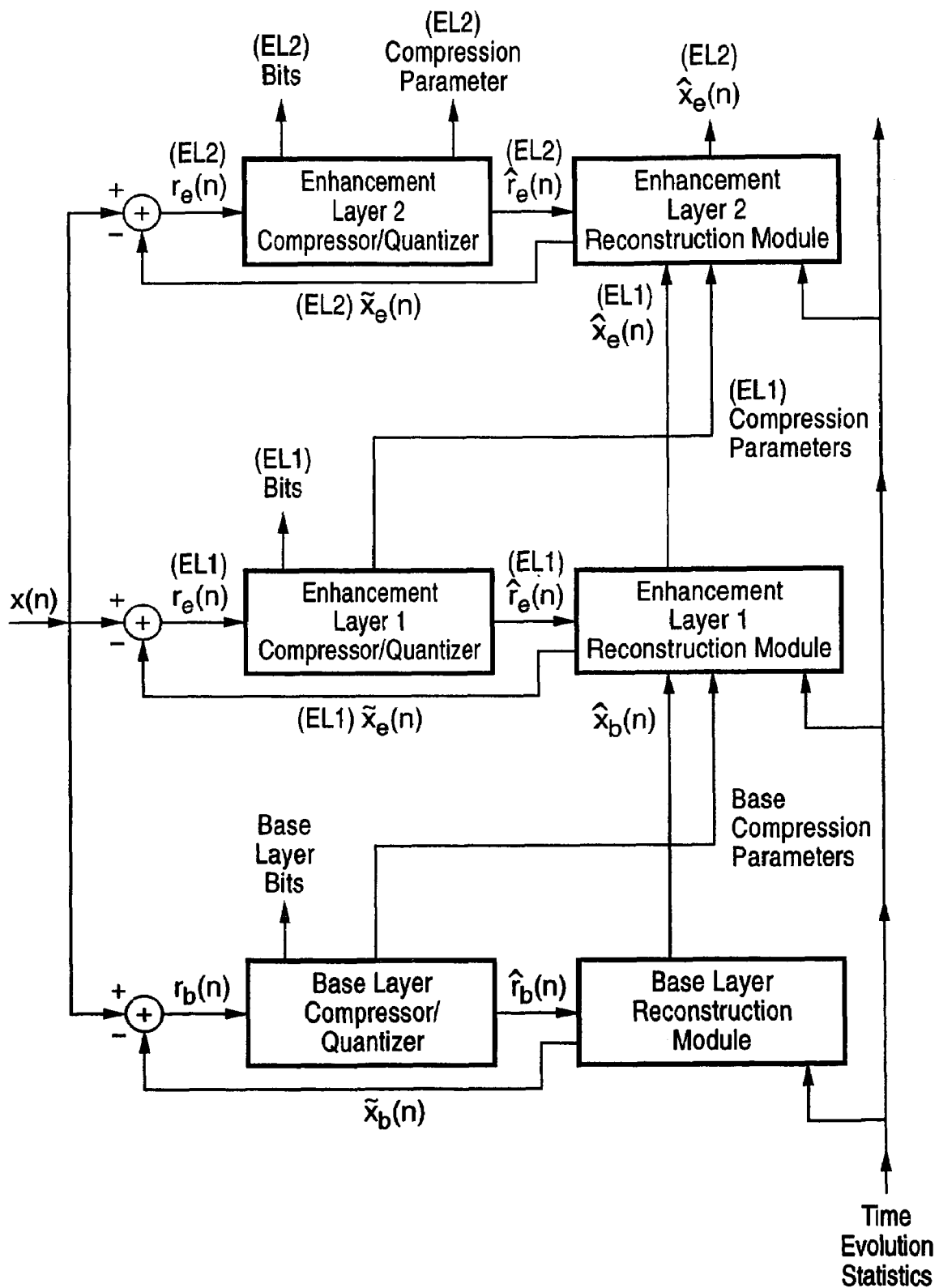
FIG. 5 is a functional block diagram of a three-layer scalable encoder employing the enhancement encoder of the present invention.

FIG. 5 shows how the modules described in FIG. 2 through FIG. 4 may be combined to obtain a complete scalable predictive encoder. Only three layers are shown without implying any limitation, as extensions to further layers is obvious and straightforward. Most inputs and outputs were explained in the context of the previous figures, and to distinguish between the notation for the first and second enhancement layer signals, the prefix EL1 or EL2 was added, respectively.

The signal frame to be compressed (which may be the original raw signal, or any set of coefficients extracted from it for the purpose of compression) denoted $x(n)$ is fed to all layers in parallel. In each layer the predicted frame ($\tilde{x}_b(n)$ in the base layer, (EL1)$\tilde{x}_e(n)$ in the first enhancement layer, and (EL2) $\tilde{x}_e(n)$ at the second enhancement layer) is subtracted from $x(n)$ to obtain the prediction error (or residual) at the layer ($r_b(n)$, (EL1) $r_e(n)$, and (EL2) $r_e(n)$, for the base, first enhancement and second enhancement layers, respectively). The residual is compressed by the layer's Compressor/Quantizer which outputs: the layer's bits for transmission to the decoder, the reconstructed (quantized) residual ($\hat{r}_b(n)$, (EL1) $\hat{r}_e(n)$, and (EL2) $\hat{r}_e(n)$, for the base, first enhancement and second enhancement layers, respectively), as input to the layer's reconstruction module, and the set of compression parameters for use by a higher layer. Note that the enhancement layer compressor/quantizer subsumes the compressor 120 of FIG. 2 as, beside the bit stream, it also outputs the quantized residual. The reconstruction module of each layer processes its input signals as per FIGS. 3 and 4, and outputs the reconstructed frame for the layer ($\hat{x}_b(n)$, (EL1) $\hat{x}_e(n)$, and (EL2) $\hat{x}_e(n)$, for the base, first enhancement and second enhancement layers, respectively), and the layer's predicted frame ($\tilde{x}_b(n)$, (EL1) $\tilde{x}_e(n)$, and (EL2) $\tilde{x}_e(n)$, for the base, first enhancement and second enhancement layers, respectively).

Figure 6:
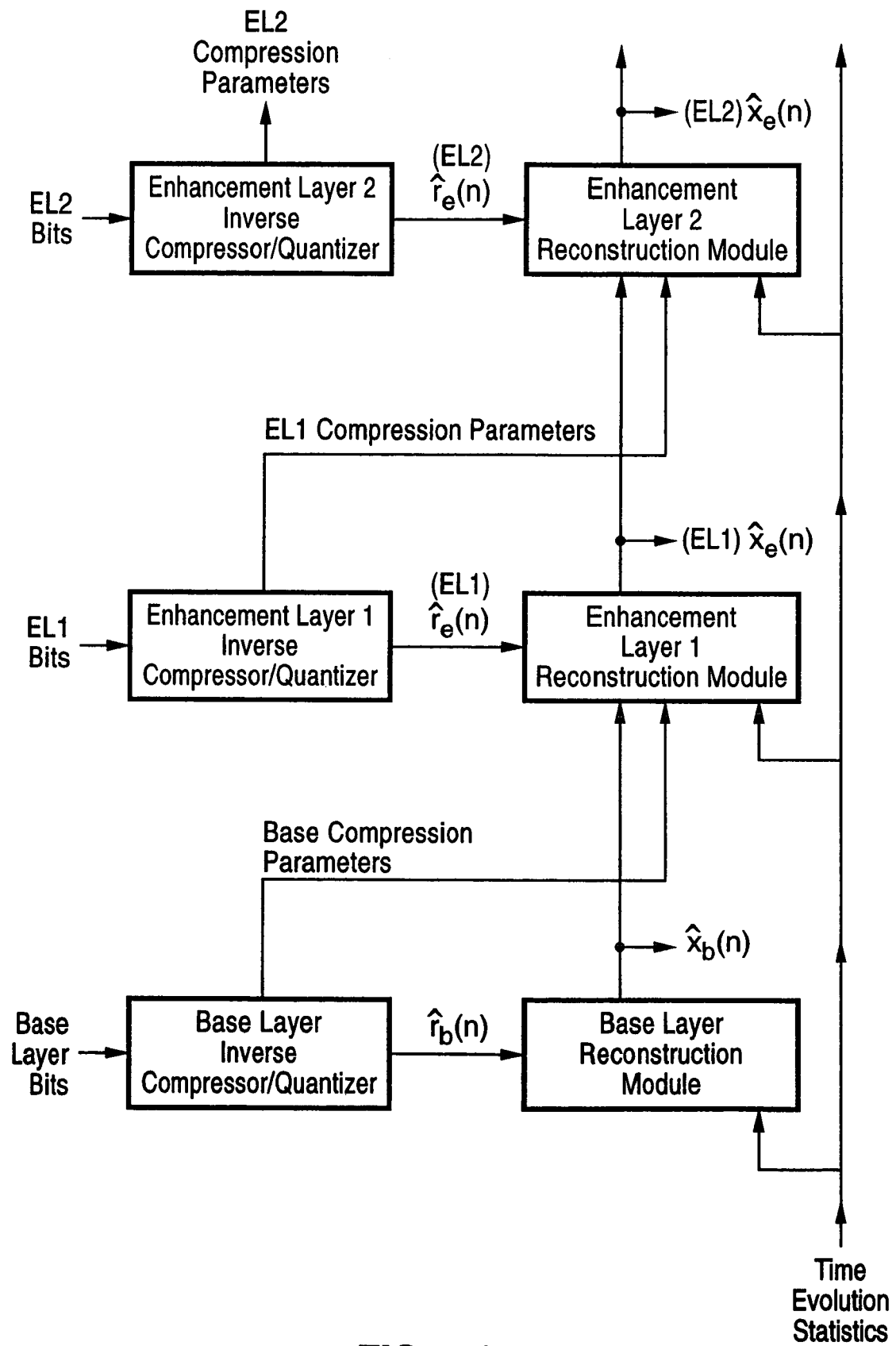
FIG. 6 is a functional block diagram of a three-layer scalable decoder corresponding to the encoder shown in FIG. 5.

The corresponding three layer scalable predictive decoder is shown in FIG. 6. Each layer's inverse compressor/quantizer receives as input the layer's bit stream from which it reproduces the layer's quantized residual. It also extracts the layer's compression parameters for use by a higher layer reconstruction module. The rest of the diagram is identical to the encoder of FIG. 2 and similarly produces the reconstructed frame at each layer.

It will be appreciated that the invention is generally applicable to predictive coding and, in particular, may be applied to known vector quantizer-based compression techniques, and known transform-based techniques. Further, it is applicable to compression of speech, audio, and video signals. A combining rule employing optimal estimation for scalable compression is described next as an implementation example of the invention.

In typical predictive coding, a number of signal representation coefficients (e.g., vectors of transform coefficients, line spectral frequencies, or vectors of raw signal samples) are extracted per frame and quantized independently. A specific low complexity implementation of the invention consists of optimally combining the information available for predicting the coefficient at an enhancement-layer. The reconstructed coefficient at the base-layer, $\hat{x}_b(n)$, and the quantization interval (or partition region in the case of vector quantization) of the corresponding reconstructed residual $\hat{r}_b(n)$, determine an interval/cell I(n) within which the original coefficient x(n) must lie. From the corresponding reconstructed coefficient at the previous enhancement-layer frame, $\hat{x}_e(n-1)$, and a statistical model on time evolution of the coefficients, one may construct a probability density function for x(n) conditional on $\hat{x}_e(n-1)$, denoted by $p[x(n)|\hat{x}_e(n-1)]$. The optimal estimate of x(n) is obtained by expectation:

$$\tilde{x}_e(n) = \frac{\int_{I(n)} xp[x(n)|\hat{x}_e(n-1)]dx}{\int_{I(n)} p[x(n)|\hat{x}_e(n-1)]dx}.$$

This predictor incorporates the information provided by the base-layer (interval within which x(n) lies), and by the enhancement-layer (probability distribution of x(n) conditional on $\hat{x}_e(n-1)$).

Figure 7:
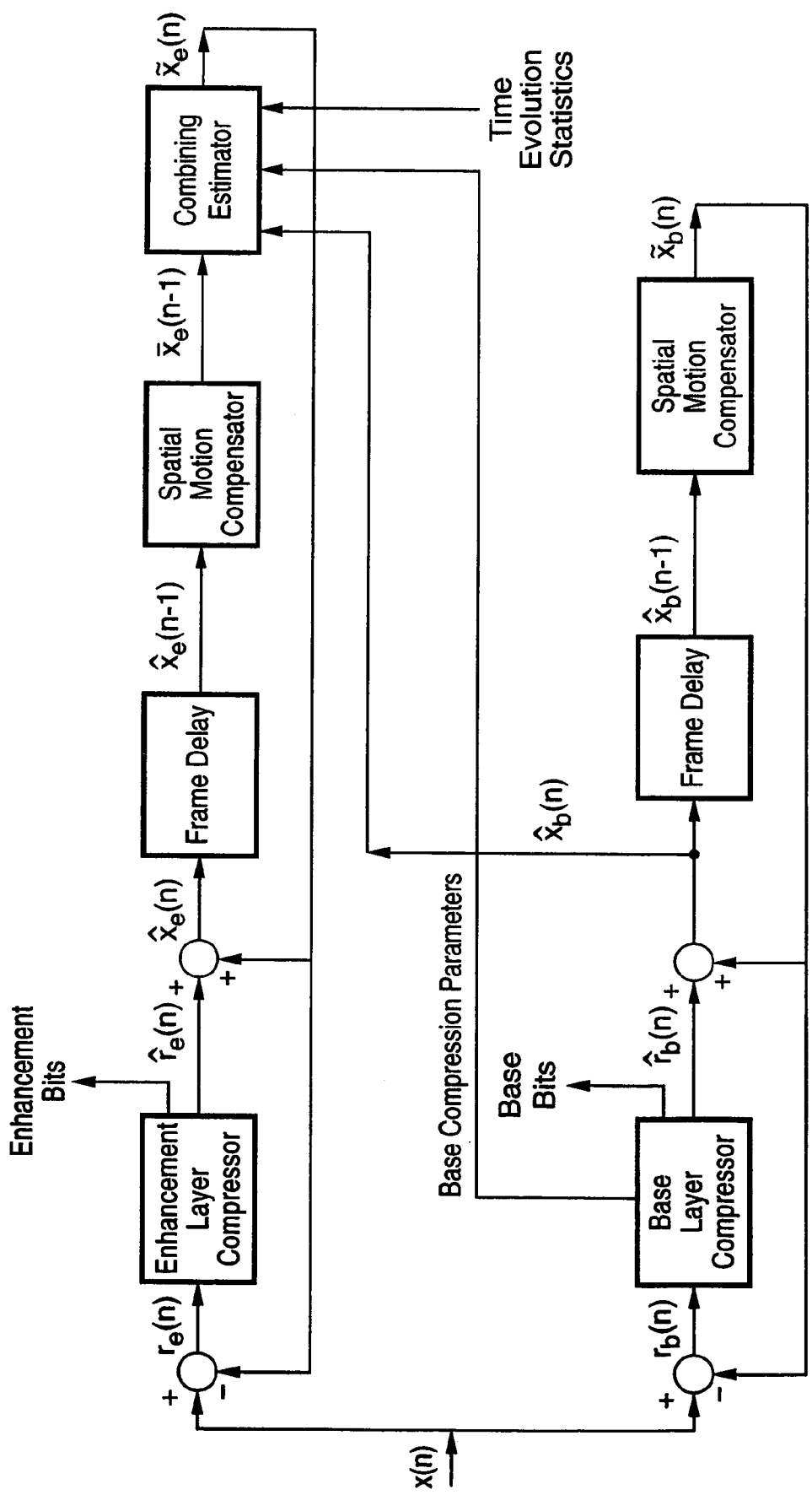
FIG. 7 is a functional block diagram of a two-layer scalable video encoder employing the enhancement encoder of the present invention.
Figure 8:
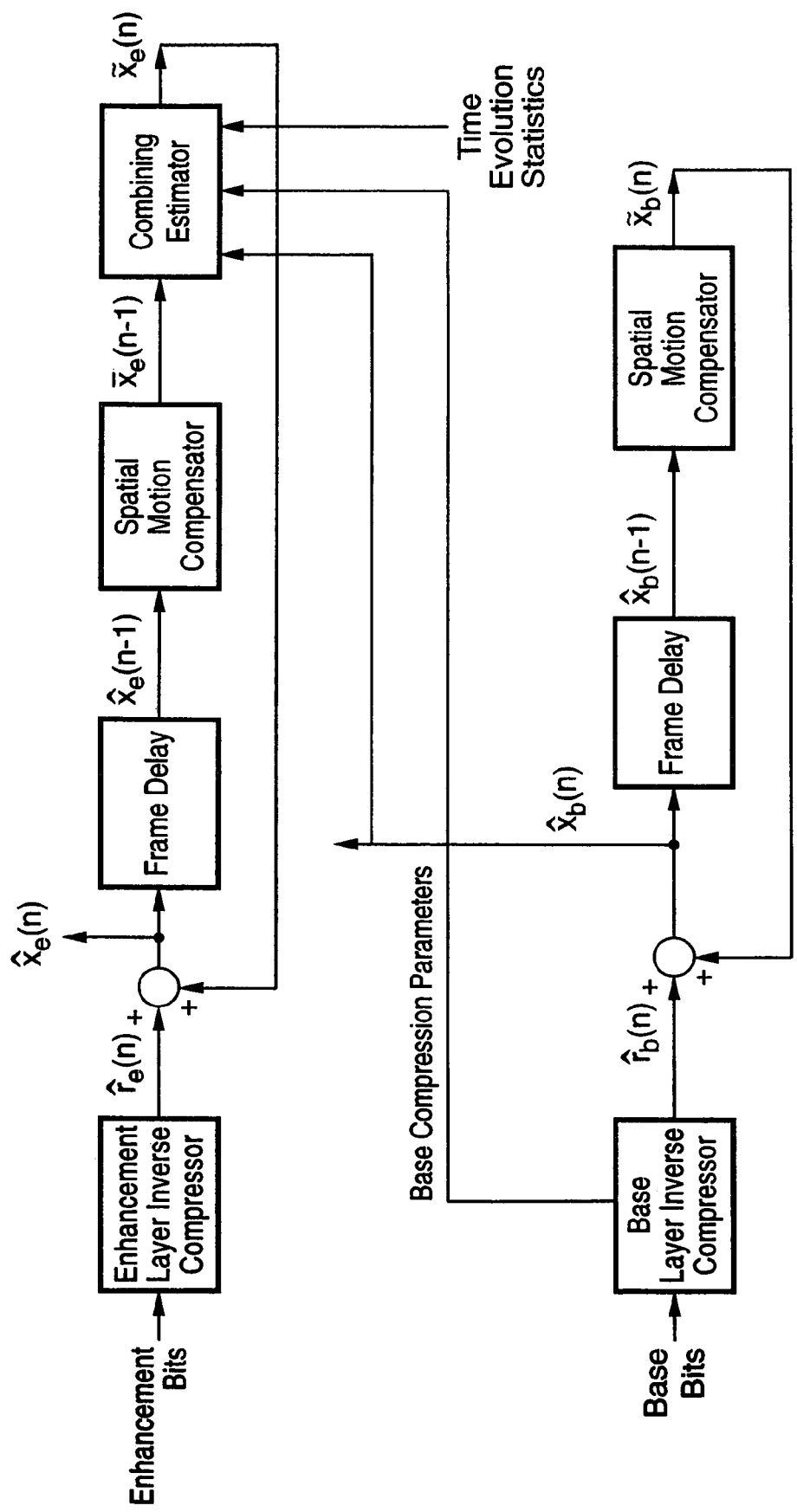
FIG. 8 is a functional block diagram of a two-layer decoder corresponding to the encoder shown in FIG. 7.
Figure 9:
FIG. 9 is a functional block diagram of the spatial motion compensator blocks shown in FIG. 7 and FIG. 8.

Referring now to FIG. 7 and FIG. 8, a system for scalable predictive transform coding which is designed for the compression of video signals is shown. In current practice and standards (e.g., [4]), the system uses motion compensation for basic frame prediction, applies the discrete cosine transform (DOT) to the prediction error (residual), and quantizes the transform coefficients one at a time. A block diagram of a two-layer scalable video encoder is shown in FIG. 7, and the corresponding decoder is shown in FIG. 8. FIG. 9 shows a functional block diagram corresponding to the spatial motion compensator blocks shown in the base layer and the enhancement layer.

Note that, for simplicity, the symbols $x, r, \hat{x}, \hat{r}, \tilde{x}$ for the video and residual signals at the base and enhancement layers in the diagram are in the transform domain, even though motion compensation is performed in the spatial domain (FIG. 9). Note further that additional enhancement layers may be added where an enhancement layer k builds on and relates to layer k−1 below it exactly as shown for the first two enhancement layers.

The first-order Laplace-Markov process was chosen for modeling the time evolution statistics of the video signal:

$$x(n)=\rho MC[x(n-1)]+z(n),$$

where x(n) is the DCT coefficient in the current frame and MC[x(n−1)] is the corresponding (after motion compensation) coefficient in the previous frame. The correlation coefficient ρ is assumed to be nearly one. As x(n) has a Laplacian density, the driving process, z(n), is zero-mean, white, stationary, and has the density $$p(z)=\rho^2\delta(z)+(1-\rho^2)\alpha/2e^{-\alpha|z|}.$$

(Both α and ρ may in practice be estimated "offline" from training data, or via an adaptive estimator that tracks variations in local statistics of the signal). The base layer performs standard video compression: its predictor consists only of motion compensation, $\hat{x}_b(n)=MC[\hat{x}_b(n-1)]$, the residual $r_b(n)=x(n)-\tilde{x}_b(n)$ is quantized and the corresponding index is transmitted. Let [a,b] be the quantization interval, hence $r_b(n) \in [a,b]$. Thus the information the base layer provides on x(n) is captured in the statement:

$$x(n) \in [\tilde{x}_b(n)+a, \tilde{x}_b(n)+b].$$

At the enhancement layer, the prediction exploits the information available from both layers. The optimal predictor is given therefore by the expectation:

$$\tilde{x}_e(n)=E\{x(n)|\hat{x}_e(n-1), x(n) \in [\tilde{x}_b(n)+a, \tilde{x}_b(n)+b]\},$$

which is conveniently rewritten as $$\tilde{x}_e(n)=\overline{x}_e(n-1)+E\{z(n)|z(n) \in I_z(n)\}$$

where $$\overline{x}_e(n-1)=MC[\hat{x}_e(n-1)]$$

and the expectation interval is $$I_z(n)=[\tilde{x}_b(n)+a-\overline{x}_e(n-1), \tilde{x}_b(n)+b-\overline{x}_e(n-1)]$$

This prediction is directly implemented using the model for p(z) given above:

$$\tilde{x}_e(n)=\overline{x}_e(n-1)+\frac{\int_{I_z(n)} zp(z)dz}{\int_{I_z(n)} p(z)dz}.$$

The integral may be analytically evaluated and its closed form solution given explicitly in terms of the integral limits and the parameters α, β, is normally used for simple implementation.

This embodiment of the invention is of low complexity, uses standard video compression for its base layer, and provides substantial performance gains which build up and increase with the number of layers implemented. Its absence in all leading standards in spite of its gains and low complexity strongly suggests that the invention is not obvious to the leading researchers and developers in the field of video compression.

The scalable predictive coding method of the invention, although illustrated herein on a two or three-layer scalable system, is repeatedly applicable to further layers of enhancement in a straightforward manner. For example, at layer k we combine signal information from the current reconstructed frame at layer k−1, and from the previous reconstruction frame at layer k. A higher complexity version allows for the combining rule to take into account data from all lower layers. In the special implementation described, information from all lower layers contributes to restricting the final interval within which the coefficient must lie. Another higher complexity version uses higher order prediction (based on multiple past frames).

Another application of the invention pertains to time-varying channels, such as mobile communications, and most common network communications. When the receiver experiences an improvement in channel conditions, it attempts to decode higher enhancement bits and improve the quality of the reconstruction. However, it can not compute the enhancement layer prediction as past enhancement layer reconstruction frames were not decoded and are not available. The present invention includes a solution to this problem, which comprises periodically (e.g., once per fixed number of frames) constraining the enhancement encoder to exclusively use lower layer information for the prediction. This periodic constrained prediction synchronizes the enhancement decoder with the enhancement encoder and allows the receiver to decode the enhancement-layer signals. The frequency of application of this constrained mode may be different for each layer and may be optimized for the time-varying channel statistics. The trade off is between some temporary degradation in prediction (when the prediction is constrained) and the receiver's capability to upgrade to enhancement layer performance as the channel conditions improve.

Finally, it will be appreciated that the scalability advantages of the invention may be easily combined with known methods for temporal and spatial scalability.

Accordingly, it will be seen that this invention provides for efficient scalability of predictive coding that is applicable to standard video and audio compression. The invention uses most or all of the information available at an enhancement-layer to improve the quality of the prediction. In addition, the invention provides for enhancement-layer synchronization to accommodate situations where the communication rate for a given receiver is time varying (e.g., in mobile communications). Although the description above contains many specificities, these should not be construed as limiting the scope of the invention but as merely providing illustrations of some of the presently preferred embodiments of this invention. Thus the scope of this invention should be determined by the appended claims and their legal equivalents.

The invention claimed is:

1. A method for predicting a current frame of data in a digital coding system wherein a signal is segmented into frames of data that are sequentially encoded, said system including a base layer and an enhancement layer, said base layer including a base encoder and a base decoder, said enhancement layer including an enhancement encoder, an enhancement layer estimator, and an enhancement decoder, said base decoder producing a reconstructed signal, said enhancement layer estimator producing a prediction of said current frame of data, said enhancement decoder producing an enhanced reconstructed signal, said method comprising:
  applying reconstructed data representing a current base layer frame and reconstructed data representing a previous enhancement layer frame as inputs to the enhancement layer estimator;
  applying additional information from the base layer as additional input to the enhancement layer estimator; and
  predicting the current frame of data at the enhancement layer by processing and combining said inputs.

2. A method for predicting a current frame of data in a digital coding system wherein a signal is segmented into frames of data that are sequentially encoded, said system including a base layer and an enhancement layer, said base layer including a base encoder and a base decoder, said enhancement layer including an enhancement encoder, an enhancement layer estimator, and an enhancement decoder, said base decoder producing a reconstructed signal, said enhancement layer estimator producing a prediction of said current frame of data, said enhancement decoder producing an enhanced reconstructed signal, said method comprising:
  applying reconstructed data representing a current base layer frame and reconstructed data representing a previous enhancement layer frame as inputs to the enhancement layer estimator;
  applying values of compression parameters employed by the base layer encoder as additional inputs to the enhancement layer estimator; and
  predicting the current frame of data at the enhancement layer by processing and combining said inputs.

3. The method of claim 2, wherein said compression parameters are parameters used for compressing the base layer prediction error.

4. The method of claim 2, wherein said compression parameters include a quantization interval employed in the base layer compressor.

5. A digital coding system wherein a signal is segmented into frames of data that are sequentially encoded, comprising:
  a base layer, said base layer including a base encoder and a base decoder;
  an enhancement layer, said enhancement layer including an enhancement encoder, an enhancement layer estimator, and an enhancement decoder;
  said base decoder producing a reconstructed signal;
  said enhancement layer estimator producing a prediction of a current frame of data;
  said enhancement decoder producing an enhanced reconstructed signal; and
  means for predicting the current frame of data by carrying out the steps of:
    applying reconstructed data representing a current base layer frame and reconstructed data representing a previous enhancement layer frame as inputs to the enhancement layer estimator;
    applying additional information from the base layer as additional input to the enhancement layer estimator; and
    predicting the current frame of data at the enhancement layer by processing and combining said inputs.

6. A digital coding system wherein a signal is segmented into frames of data that are sequentially encoded, comprising:
  a base layer, said base layer including a base encoder and a base decoder;

an enhancement layer, said enhancement layer including an enhancement encoder, an enhancement layer estimator, and an enhancement decoder;

said base decoder producing a reconstructed signal;

said enhancement layer estimator producing a prediction of a current frame of data;

said enhancement decoder producing an enhanced reconstructed signal; and means for predicting the current frame of data by carrying out the steps of:

applying reconstructed data representing a current base layer frame and reconstructed data representing a previous enhancement layer frame as inputs to the enhancement layer estimator;

applying values of compression parameters employed by the base layer encoder as additional inputs to the enhancement layer estimator; and predicting the current frame of data at the enhancement layer by processing and combining said inputs.

7. A digital coding system as recited in claim 6, wherein said compression parameters are parameters used for compressing the base layer prediction error.

8. A digital coding system as recited in claim 6, wherein said compression parameters include a quantization interval employed in the base layer compressor.

9. A digital coding system wherein a signal is segmented into frames of data that are sequentially encoded, comprising:

a base layer, said base layer including a base encoder and a base decoder;

an enhancement layer, said enhancement layer including an enhancement encoder, an enhancement layer estimator, and an enhancement decoder;

said base decoder producing a reconstructed signal;

said enhancement layer estimator producing a prediction of a current frame of data;

said enhancement decoder producing an enhanced reconstructed signal;

a programmable data processor; and programming executable by said programmable data processor for predicting the current frame of data by carrying out the steps of:

applying reconstructed data representing a current base layer frame and reconstructed data representing a previous enhancement layer frame as inputs to the enhancement layer estimator;

applying additional information from the base layer as additional input to the enhancement layer estimator; and predicting the current frame of data at the enhancement layer by processing and combining said inputs.

10. A digital coding system wherein a signal is segmented into frames of data that are sequentially encoded, comprising:

a base layer, said base layer including a base encoder and a base decoder;

an enhancement layer, said enhancement layer including an enhancement encoder, an enhancement layer estimator, and an enhancement decoder;

said base decoder producing a reconstructed signal;

said enhancement layer estimator producing a prediction of a current frame of data;

said enhancement decoder producing an enhanced reconstructed signal;

a programmable data processor; and programming executable by said programmable data processor for predicting the current frame of data by carrying out the steps of:

applying reconstructed data representing a current base layer frame and reconstructed data representing a previous enhancement layer frame as inputs to the enhancement layer estimator;

applying values of compression parameters employed by the base layer encoder as additional inputs to the enhancement layer estimator; and predicting the current frame of data at the enhancement layer by processing and combining said inputs.

11. A digital coding system as recited in claim 10, wherein said compression parameters are parameters used for compressing the base layer prediction error.

12. A digital coding system as recited in claim 10, wherein said compression parameters include a quantization interval employed in the base layer compressor.

* * * * *